United States Patent
Maroney

(10) Patent No.: US 9,535,472 B1
(45) Date of Patent: Jan. 3, 2017

(54) REDUNDANT POWER BACKPLANE FOR NAS STORAGE DEVICE

(75) Inventor: John Maroney, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 736 days.

(21) Appl. No.: 13/436,849

(22) Filed: Mar. 31, 2012

(51) Int. Cl.
*G06F 13/40* (2006.01)
*G06F 1/26* (2006.01)
*G06F 1/16* (2006.01)

(52) U.S. Cl.
CPC .. *G06F 1/26* (2013.01); *G06F 1/16* (2013.01)

(58) Field of Classification Search
CPC .......... G11B 33/128; G06F 1/187; G06F 1/26; G06F 1/188; G06F 1/263; G06F 3/0626; G06F 3/0683; G06F 3/067; G06F 13/4295; G06F 13/4068; H05K 7/1492; H05K 7/1439
USPC ........... 713/300, 330, 340; 323/207; 711/114
See application file for complete search history.

(56) References Cited

U.S. PATENT DOCUMENTS

| | | | |
|---|---|---|---|
| 6,091,609 A | 7/2000 | Hutson et al. | |
| 6,177,790 B1 | 1/2001 | Emberty et al. | |
| 6,651,178 B1 * | 11/2003 | Voegeli et al. | 713/300 |
| 6,738,915 B1 * | 5/2004 | Mott et al. | 713/330 |
| 6,859,882 B2 | 2/2005 | Fung | |
| 7,027,880 B2 * | 4/2006 | Izzo et al. | 700/21 |
| 7,109,603 B2 * | 9/2006 | Wise et al. | 307/28 |
| 7,243,248 B1 | 7/2007 | Roux et al. | |
| 7,280,353 B2 * | 10/2007 | Wendel et al. | 361/679.33 |
| 7,305,572 B1 * | 12/2007 | Burroughs et al. | 713/300 |
| 7,440,215 B1 * | 10/2008 | Sardella et al. | 360/69 |
| 7,612,467 B2 | 11/2009 | Suzuki et al. | |
| 7,630,841 B2 * | 12/2009 | Comisky et al. | 702/60 |
| 7,661,005 B2 * | 2/2010 | Spengler et al. | 713/330 |
| 7,843,083 B2 * | 11/2010 | Chang | 307/65 |
| 8,116,075 B2 * | 2/2012 | Hall et al. | 361/679.33 |
| 8,135,965 B2 * | 3/2012 | Mason | 713/300 |
| 8,225,116 B2 * | 7/2012 | Chen et al. | 713/310 |
| 8,587,150 B2 * | 11/2013 | Parakulam | 307/72 |
| 8,742,624 B1 * | 6/2014 | Sagarwala et al. | 307/82 |
| 2002/0124128 A1 | 9/2002 | Qiu | |
| 2003/0016515 A1 | 1/2003 | Jackson et al. | |
| 2007/0121619 A1 * | 5/2007 | Kimbrough et al. | 370/389 |
| 2008/0093926 A1 | 4/2008 | Suzuki et al. | |
| 2009/0147393 A1 * | 6/2009 | Hakamata | G06F 1/3221 360/69 |
| 2012/0054525 A1 * | 3/2012 | Walker | 713/330 |
| 2012/0119775 A1 * | 5/2012 | Woodward et al. | 324/759.01 |
| 2012/0195548 A1 * | 8/2012 | Brunner | H04B 10/803 385/18 |
| 2013/0170258 A1 * | 7/2013 | Calvin et al. | 363/64 |
| 2014/0068286 A1 * | 3/2014 | Nguyen et al. | 713/300 |

* cited by examiner

*Primary Examiner* — Mohammed Rehman
*Assistant Examiner* — Alyaa T Mazyad

(57) ABSTRACT

The present invention relates to methods and systems for providing reliable power to a storage device, such as a network attached storage. In one embodiment, the storage device employs a redundant power backplane design using a DC-to-DC converter per drive in the backplane. Each drive is thus provided its own independent power interface to the power backplane. One embodiment may employ DC-to-DC converters having integrated N-channel MOSFETs to provide overcurrent and thermal protection. In addition, an embodiment may employ a staggered startup procedure to manage peak power draw.

20 Claims, 3 Drawing Sheets

REDUNDANT POWER BACKPLANE FOR NAS STORAGE DEVICE

BACKGROUND

Conventional multi-drive network attached storage (NAS) devices use an internal an advanced technology extended ("ATX") power supply and power backplane to interconnect and deliver power to its components. Typically, the power backplane distribute DC power, such as 5V and 12V power, from the power supply via power supply buses on the backplane. Unfortunately, these components can be susceptible to failure.

For example, ATX power supplies are subject to wear and tear due to power fluctuations, power surges, etc. Thus, ATX power supplies can be prone to failure. A failure in the ATX power supply may impact other sensitive components of the NAS device, such as the drives.

Power sequencing is one approach to reducing wear and tear on the power supply. Power sequencing is where the startup of individual drives of the NAS is staggered to reduce peak power draw and prevent overloading of the power supply. Typically, the individual drives of the NAS are connected to the power supply buses through switches, such as P-channel MOSFETs. Unfortunately, these switches in conventional backplanes are also known to be susceptible to failure and have poor performance, especially in isolating short circuit faults. Thus, even with the use of power sequencing, known NAS devices must use a higher rated ATX power supply than what would otherwise be necessary. This dramatically increases the cost of the NAS device and still does not address the underlying problems of conventional NAS devices and their backplanes.

As an alternative to power sequencing, some known NAS devices may employ fuses for protection. However, fuses still require an oversized power supply. Furthermore, fuses preclude the use of power sequencing.

BRIEF DESCRIPTION OF THE DRAWINGS

Systems and methods which embody the various features of the invention will now be described with reference to the following drawings, in which.

DETAILED DESCRIPTION

The present invention relates to methods and systems for providing reliable power to a storage device, such as a network attached storage, based on a backplane having an improved redundant and fault tolerant design. In one embodiment, a backplane comprises one converter per drive that each serve as an additional power interface. Thus, each drive is provided its own power interface on the backplane. This embodiment provides N+1 redundancy and is equivalent to the power protection as the drive redundancy of RAID 1/10/5 systems.

One embodiment may employ DC-to-DC converters having integrated N-channel MOSFETs to provide overcurrent and thermal protection. The converters may also provide short circuit protection for a drive hot plug event without affecting power of the other drives or the system. In addition, an embodiment may employ a staggered startup procedure by selectively enabling the converters to manage peak power draw.

Certain embodiments of the inventions will now be described. These embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. To illustrate some of the embodiments, reference will now be made to the figures.

Figure 1:
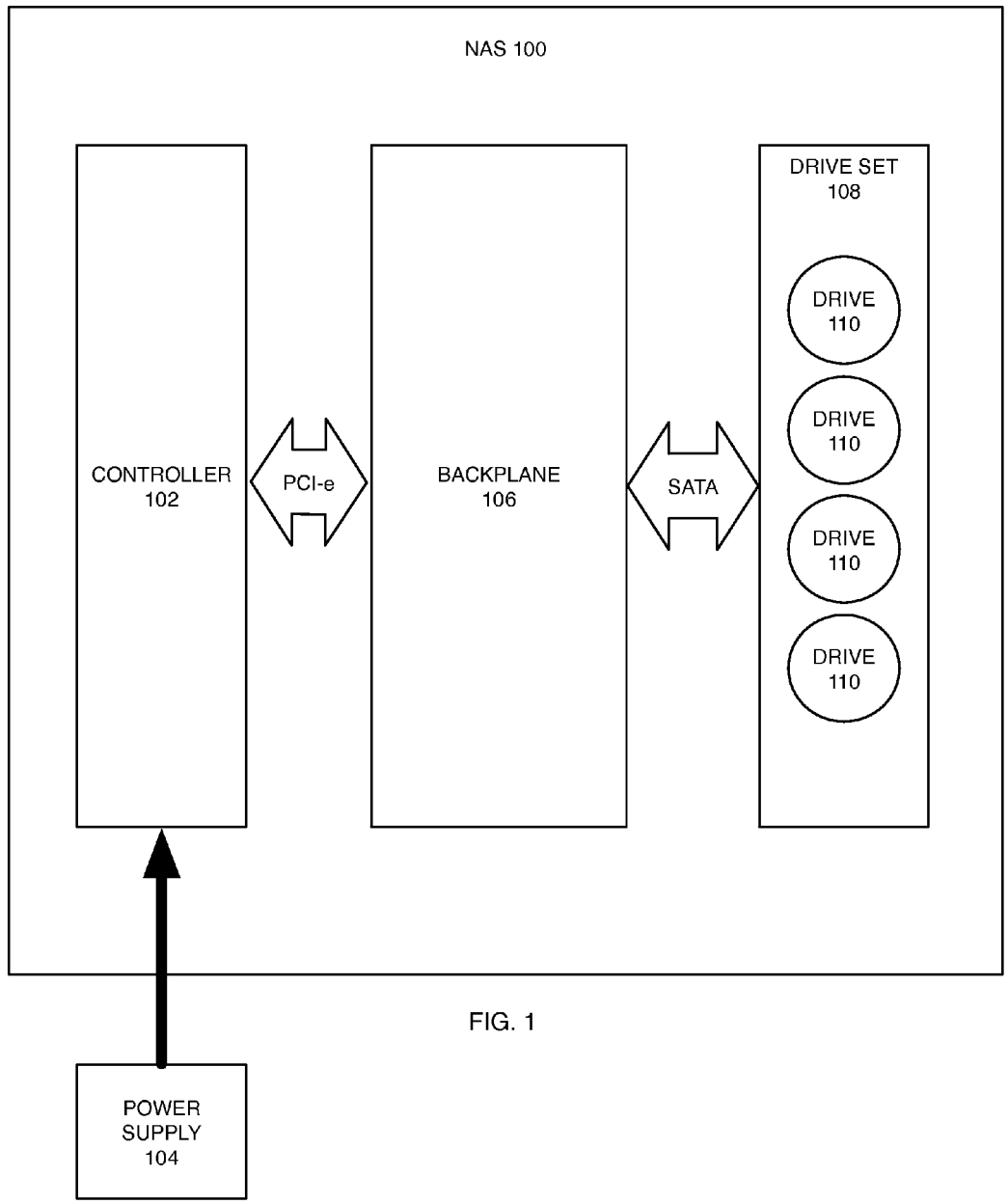
FIG. 1 shows one embodiment of a NAS device.

FIG. 1 shows an exemplary NAS device 100 in accordance with one embodiment of the present invention. The NAS device 100 may be any device capable of providing or sharing access to a file over network (not shown) to one or more hosts (not shown). For example, the NAS 100 may be implemented as a specialized computer or appliance configured to store and serve files over a network. As shown, the NAS device 100 may comprise a controller 102, a power supply 104, a backplane 106, and a drive set 108 comprising a plurality of storage media. These components will now be further described.

The controller 102 comprises the hardware, firmware, and software for controlling the operations of the NAS 100. For example, the controller 102 may manage communications between the host device 102 and the drive set 108 to write and read data. In one embodiment, the controller 102 manages the drive set 108 and presents them to the host device 102 as logical devices.

In one embodiment, the controller 102 is configured to employ a staggered startup of drives in drive set 108. For example, the controller 102 may stagger the startup of individual drives in drive set 108 by a fixed time interval, such as 1 second, 2 seconds, etc. Alternatively, the controller 102 may dynamically control the startup of the drive set 108 based on the power draw of individual drives in drive set 108. The controller 102 may monitor the power draw based on one or more status signals, such as a PRS signal (shown in FIG. 2).

Furthermore, the controller 102 may comprise circuitry, logic, and/or software that maintain the operations of the NAS 100 within the limits of the power supply 104. For example, the controller 102 may limit operations of the storage devices 108 to a maximum number of simultaneous drives running, etc.

As also shown, the controller 102 may receive DC power from power supply 104 and supplies power to the other components of the NAS. The controller 102 may comprise a regulator circuit (not shown) to maintain constant voltage levels during variations in the DC voltage from power supply 104. For example, the controller 102 may comprise various components, such as transistors, operational amplifiers, comparators, etc.

Power supply 104 provides power to the components of NAS 100. The power supply 104 is an AC power supply that is connected to an external power source, such as a wall outlet, and provides, for example, a 19-volt DC output. In one embodiment, the power supply 104 is an external power supply that may be known as an AC adapter, an AC/DC adapter, an AC/DC converter, a wall wart, a wall cube, a power brick, a plug pack, a line power adapter, a power adapter, etc. In another embodiment, the power supply 104 may be an ATX power supply. Those skilled in the art will also recognize that NAS 100 may comprise multiple power supplies, such as additional AC adapters, batteries, etc.

Backplane 106 provides a group of connections for coupling the controller 102 with the drive set 108. As shown, in one embodiment, the backplane 106 may interface with the controller 102 via a peripheral component interconnect ("PCI") or PCI express ("PCI-e") connectors. In addition, in one embodiment, the backplane 106 may interface with the drive set 108 via serial advanced technology attachment ("SATA") connectors. Such connectors are well known to those skilled in the art. Those skilled in the art will recognize that backplane 106 may support a wide variety of connectors and communication interfaces.

Backplane 106 may be implemented with one or more printed circuit boards to provide one or more buses to interconnect, for example, controller 102 and the drive set 108. In addition, backplane 106 may be configured to allow for hot swapping of drives 110 in drive set 108. Backplane 106 is further described with reference to FIG. 2.

Drive set 108 refers to the physical devices and medium on which the NAS 100 stores data, such as drives 110. For example, drive set 108 may comprise a disk controller, and disks 110. Disks 110 may be implemented based on magnetic media, solid-state memory, optical media, etc. As shown, the drive set 108 may comprise multiple drives 110 for purposes of capacity and redundancy. As a NAS device, the NAS 100 may also support various RAID levels known to those skilled in the art.

Figure 2:
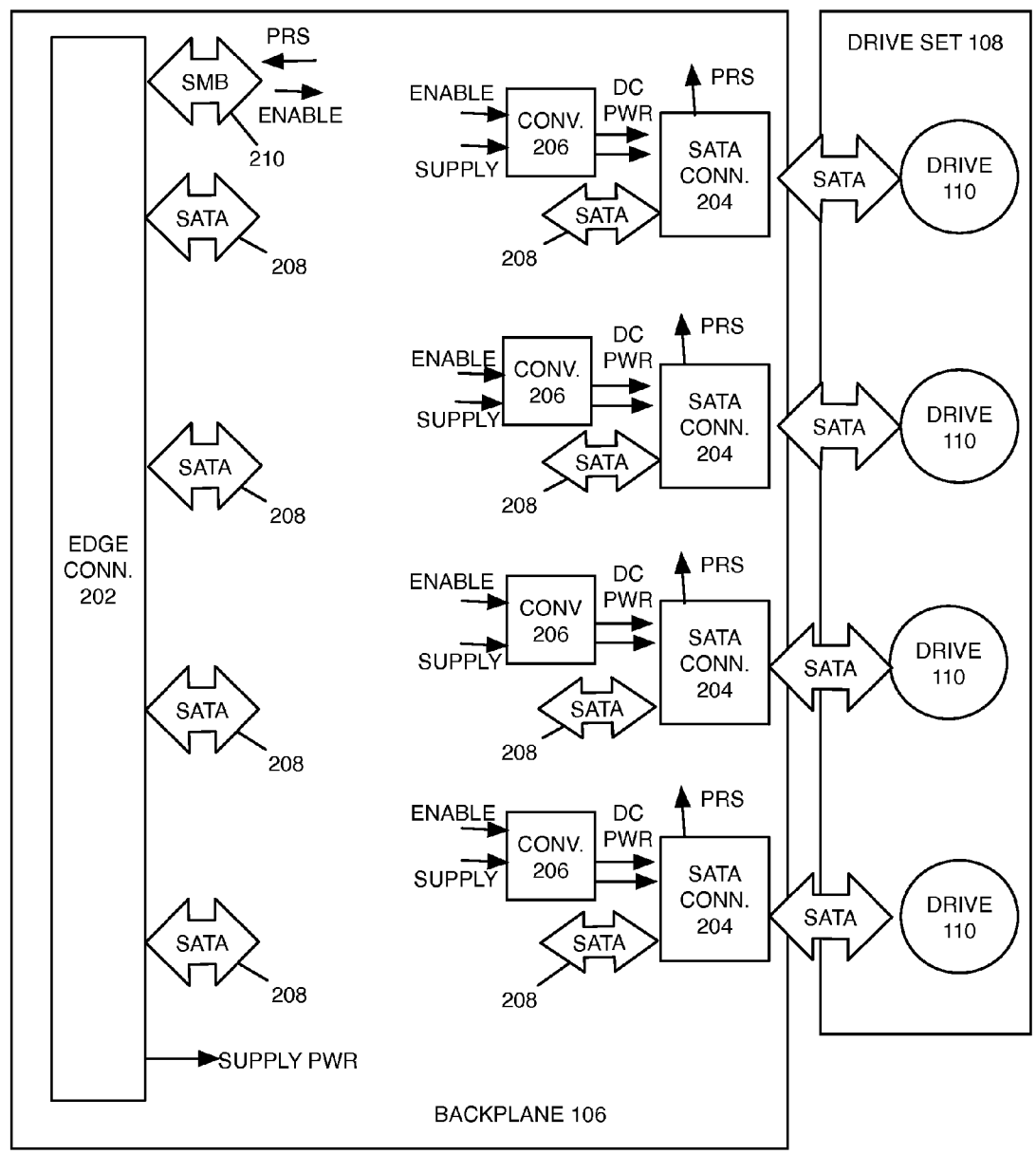
FIG. 2 shows an exemplary backplane in accordance with one embodiment of the present invention.

FIG. 2 shows an exemplary backplane and drive set in accordance with one embodiment of the present invention. As shown, the backplane 106 may comprise edge connectors 202, a set of SATA connectors 204 to interface with drives 110 in drive set 108, and converters 206. These components will now be further described below.

Edge connectors 202 provide connections for interfacing with the controller 102 (not shown in FIG. 2). For example, as noted, the edge connectors 202 may comprise one or more PCI-e connectors. Such connectors are well known to those skilled in the art. In addition, edge connectors 200 may comprise a port expander (not shown) that provides a system management bus (or "SMB") for various system management signals, such as a drive enable signal and a drive presence signal ("PRS" as shown in FIG. 2).

As shown, backplane 106 distributes signals from edge connectors 202 and provides various buses for transporting these signals to drive set 108. In one embodiment, the backplane 106 provides a set of SATA buses 208 to SATA connections 204 for communications with drives 110 in drive set 108.

In addition, the backplane 106 may provide one or more supply power signals ("SUPPLY PWR" shown in FIG. 2), such as a 19 V DC signal and/or a 3.3 V DC signal. Any power signal from a power supply, internal or external, may be carried by the backplane 106. Furthermore, the backplane 106 may provide a drive power supply enable signal ("ENABLE" signal shown in FIG. 2) and a presence status signal ("PRS" signal shown in FIG. 2) via system management bus 210 from edge connectors 202. As shown, backplane 106 routes the power supply signal and an enable signal to the converters 206. Backplane 106 may also route the PRS signal from the drives 110 to the controller 102 via the SATA connectors 204 and system management bus 210 to indicate a status of a drive 110.

SATA connectors 204 provide connections for interfacing the backplane 106 with drives 110 in the drive set 110. Such connectors are well known to those skilled in the art. The embodiments may incorporate any type of connector and communication interface, such as USB, SCSI, etc.

In one embodiment, the backplane 106 employs a fault tolerant design that is different from conventional designs. In particular, the backplane 102 may employ integrated DC-DC converters, i.e., converters 204, for each of drives 110. The converters 204 provide an additional power interface between the power supply 104 and the drives 110 in backplane 106. The converters 204 may thus provide an effective isolation of power faults, such as short circuits. In addition, the converters 204 allow the use of a staggered spinup or startup sequence responsive to the enable signal from the controller 102. This feature and other features enable the use of lower rated or more efficient components in NAS 100.

Converters 204 convert the power supply signal from controller 102 into DC power signals ("DC PWR" signals shown in FIG. 2) that can be used by the drives 110 in drive set 108. In one embodiment, converters 204 convert the power supply signal into 12 V and 5 V DC outputs that are used to power drives 110. Converters 204 may also be configured to provide various protective features. For example, in one embodiment, the converters 204 may provide short circuit protection for a drive hot plug event without affecting power of the other drives 110 or other components of the NAS 100. Such a feature enables hot swapping of drives 110 during operation while protecting against short circuits that may occur during such an event. In addition, in an embodiment, the converters 204 comprise integrated N-channel MOSFETs to provide overcurrent and thermal protection.

As also shown, converters 204 may operate responsive to an enable signal from the controller 102 via the system management bus 210. For example, the enable signal from controller 102 may be used to selectively power drives 110 individually. Such a feature may be used in one embodiment for staggered spinup or startup as well as facilitating hot swapping of drives 110.

In one embodiment, converters 204 may be implemented using N-channel MOSFETs to convert the power supply signal into the desired DC power output, such as 12 V and 5 V DC. In addition, the N-channel MOSFETs in converters 204 may provide overcurrent and thermal protection. Accordingly, converters 204 provide the backplane 106 N+1 redundancy and a fault tolerant design.

Figure 3A:
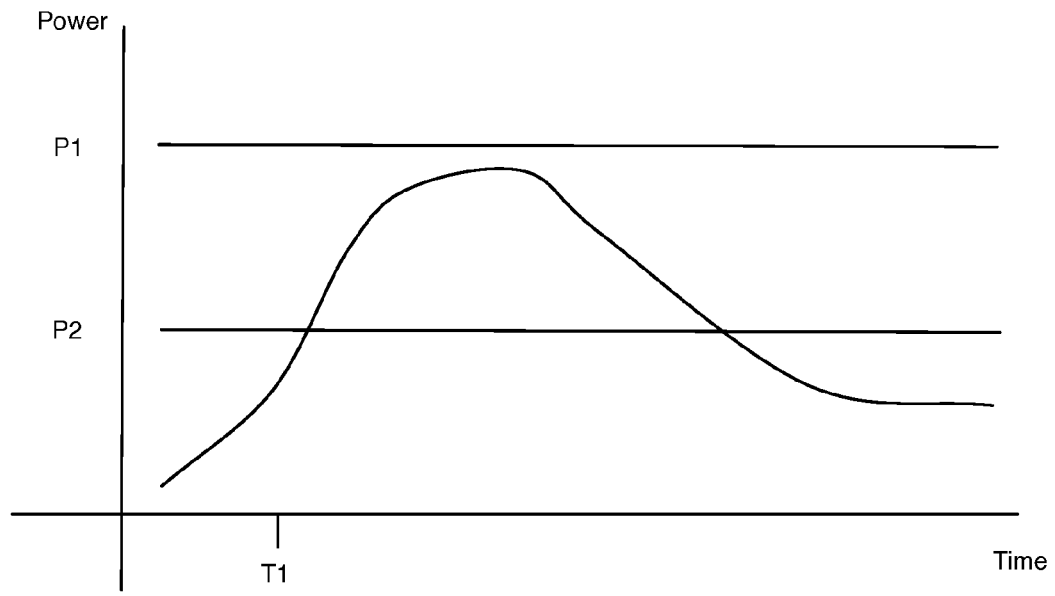
FIG. 3A shows an exemplary startup sequence of a prior art system.

FIG. 3A shows an exemplary startup sequence of a prior art system. As shown, in a typical NAS device, the device will start all or most of its disk drives at the same time. Accordingly, a typical NAS device requires a power supply that can support a relatively large peak power draw. For example, as shown, a prior art NAS device may commence start up at time T1, which then results in a peak power draw P1.

Figure 3B:
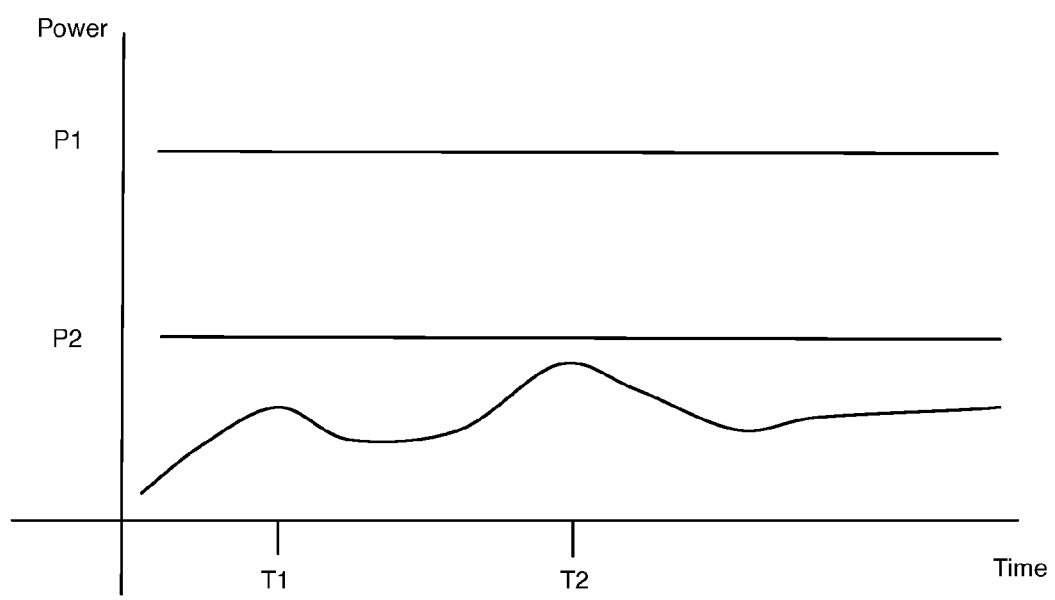
FIG. 3B shows an exemplary startup sequence of a storage system consistent with one embodiment of the present invention.

FIG. 3B shows an exemplary startup sequence of a storage system consistent with one embodiment of the present invention. This exemplary startup sequence is enabled by inclusion of the converters 204 in the backplane 106 between the power supply and the drives 110. In one embodiment, the NAS 100 is powered by a power supply 104 providing a 19 V DC output. As noted, within backplane 106 of NAS 100, converters 204 may convert 19 V power into 12 V and 5 V signals for drives 110. In the example shown, drives 110 may consume 11 Watts on average and a peak of 25 Watts. As shown, in order to accommodate a lower power rating (such as 80 or 120 Watts) for the power supply 104, the NAS 100 is configured to control its peak power draw less than power level P2.

In one embodiment, the NAS 100 employs a staggered startup to accommodate the external power supplies. In particular, the controller 102 may sequentially and selectively enable converters 204 and power drives 110 in a staggered manner. The staggered startup may be based on a fixed time period, such as 2 seconds, or based on the power draw of the drives 110 as they are being started.

For example, as shown, at time T1, the NAS device 100 may start a first of its disk drives 110 by setting the ENABLE signal for the respective converter 204 for this drive. At a later time T2, the NAS device 100 may then start a second of its disk drives 110 by then setting the ENABLE for the respective converter 204 for this second drive, and so forth. As shown, this staggering of the start up of disk drives thus maintains the power draw less than power P2.

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments, which do not provide all of the features and advantages set forth herein, are also within the scope of this disclosure. Accordingly, the scope of the present disclosure is intended to be defined only by reference to the appended claims.

What is claimed is:

1. A storage device configured with a decentralized power backplane, said storage device comprising:
   at least one disk drive;
   a controller configured to provide at least one power signal from a power supply, and to manage access to the at least one disk drive; and
   a backplane, interconnecting the controller and the at least one disk drive, the backplane comprising:
      a plurality of converters configured to convert the at least one power signal into a set of second power signals for the at least one disk drive; and
      a plurality of connectors coupled to the plurality of converters, wherein the backplane is separate from the controller, wherein the plurality of connectors are configured to receive the set of second power signals from the plurality of converters, provide the set of second power signals to the at least one disk drive, and communicate data with the at least one disk drive.

2. The storage device of claim 1, wherein the plurality of converters in the backplane comprise a respective DC-to-DC converter for each disk drive.

3. The storage device of claim 1, wherein each of the converters comprises at least one N-channel MOSFET.

4. The storage device of claim 1, wherein the controller is coupled to the backplane via a peripheral component interconnect express (PCI-e) connection.

5. The storage device of claim 1, wherein the at least one disk drive is coupled to the backplane via a serial advanced technology attachment (SATA) connection.

6. The storage device of claim 2, wherein the DC-to-DC converters are rated at 25 Watts or less.

7. The storage device of claim 1, wherein the backplane further comprises a system management bus for carrying signals from the controller.

8. The storage device of claim 7, wherein the plurality of converters are further configured to respond to an enable signal from the system management bus for selectively enabling power from the converters.

9. A method of starting up a storage device, wherein the storage device comprises a plurality of drives, and is powered by a power backplane having respective DC-to-DC converters for each of the plurality of drives, said method comprising:
   starting, by a controller of the storage device, a first drive of the plurality of drives by enabling a first converter for the first drive, wherein the power backplane comprises the first converter, and a first connector coupled to the first converter and the first drive, wherein the first connector is configured to receive a first set of power signals from the first converter, and to communicate data with the first drive, and wherein the controller is separate from the power backplane;
   starting, by the controller after starting the first drive, a second drive by enabling a second converter for the second drive, wherein the power backplane comprises the second converter, and a second connector coupled to the second converter and the second drive, wherein the second connector is configured to receive a second set of power signals from the second converter, and to communicate data with the second drive; and
   managing, by the controller, access to the first drive and the second drive.

10. The method of claim 9, wherein the first drive comprises a hard disk drive.

11. The method of claim 9, wherein starting the second drive comprises starting the second drive when a power draw after starting the first drive is below a threshold level.

12. The method of claim 9, further comprising waiting, by the controller, a predetermined time period after starting the first drive before starting the second drive.

13. The method of claim 12, wherein the predetermined time period is approximately 2 seconds.

14. A network attached storage configured with a decentralized power backplane, said network attached storage comprising:
   a plurality of storage devices;
   a controller configured to provide at least one power signal from a power supply, and to manage access to the plurality of storage devices; and
   a backplane, interconnecting the controller and the plurality of storage devices, the backplane comprising:
   a set of respective power interface components for each storage device; and
   a set of connectors coupled to the set of respective power interface components, and the plurality of storage devices, wherein the set of connectors are configured to receive power from the set of respective power interface components, and to communicate data with the plurality of storage devices, wherein the backplane is separate from the controller.

15. The network attached storage of claim 14, wherein the power interface components comprise a DC-to-DC converter.

16. The network attached storage of claim 15, wherein the DC-to-DC converter comprises at least one N-channel MOSFET.

17. The network attached storage of claim 15, wherein the DC-to-DC converter is configured to convert the at least one power signal from the controller into a 12 volt DC output and a 5 volt DC output.

18. The network attached storage of claim 14, wherein the backplane is configured to provide a system management bus for carrying signals from the controller.

19. The network attached storage of claim 18, wherein each of the power interface components is selectively enabled responsive to an enable signal from the system management bus.

20. The network attached storage of claim 14, wherein the power supply is an external power supply.

* * * * *